United States Patent
Ruffa

(10) Patent No.: US 7,349,292 B1
(45) Date of Patent: Mar. 25, 2008

(54) INCREASED EFFECTIVE APERTURE FOR RECEIVE ARRAYS

(75) Inventor: Anthony A. Ruffa, Hope Valley, RI (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 262 days.

(21) Appl. No.: 11/217,838

(22) Filed: Aug. 24, 2005

(51) Int. Cl.
*H04B 11/00* (2006.01)

(52) U.S. Cl. ........................... 367/131; 367/176

(58) Field of Classification Search ............... 367/131, 367/176, 901
See application file for complete search history.

(56) References Cited

U.S. PATENT DOCUMENTS

| 4,333,169 | A | * | 6/1982 | Hoyt | 367/1 |
| 4,625,302 | A | * | 11/1986 | Clark | 367/24 |
| 5,999,491 | A | * | 12/1999 | Harvey et al. | 367/144 |
| 6,341,661 | B1 | * | 1/2002 | Bick et al. | 181/111 |

* cited by examiner

*Primary Examiner*—Ian J. Lobo
(74) *Attorney, Agent, or Firm*—James M. Kasischke; Michael P. Stanley; Jean-Paul A. Nasser

(57) ABSTRACT

A sonar dome having an acoustic array housed therein. A plurality of bubbles are generated within the fluid inside the sonar dome. The generated bubbles are of an amount and size to reduce the speed of sound within the sonar dome fluid. Reduction of the speed of sound within the sonar dome fluid effectively increases the aperture of the acoustic array. The bubbles can be generated from a gas source or electrolytically. Typically, each individual bubble is less than 0.01 mm in diameter to reduce bubble velocity in the fluid.

6 Claims, 2 Drawing Sheets

INCREASED EFFECTIVE APERTURE FOR RECEIVE ARRAYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to enhancing receive arrays in a sonar dome.

(2) Description of the Prior Art

The current art for sonar domes is such that the sonar domes containing receive arrays are typically pressurized with sea water. The performance of sonar domes in determining the location of acoustic targets is limited in size by spacing of the receiver elements in an array. In one part, this is a function of the Nyquist-Shannon sampling theorem as applied spatially to an array of sensors. Beam width is a function of the array spacing and the speed of sound in the media. Often times, a larger aperture is necessary, and cannot be achieved due to physical limitations caused by the current sonar dome size. Accordingly, a need in the art exists for enhancing the current arrangement of receive arrays within known sonar domes.

The following patents, for example, disclose known sonar domes and reduction of cavitation, but do not disclose a solution to the need to increase the effective aperture of sonar receive arrays that are enclosed in a sonar dome. U.S. Pat. No. 4,764,909 to Darner;

U.S. Pat. No. 5,008,863 to Archibald;

U.S. Pat. No. 5,717,657 to Ruffa; and

U.S. Pat. No. 5,382,286 to Fanning et al.

It should be understood that the present invention would provide an increased effective aperture of sonar receive arrays enclosed in a sonar dome. This is done by reducing the effective speed of sound inside a sonar dome, so that the same sized receive array is larger compared to a wavelength than it otherwise would be if the dome were simply filled with pressurized water.

SUMMARY OF THE INVENTION

Therefore it is an object of this invention to provide enhanced sonar receive arrays within a sonar dome.

Another object of this invention is to provide enhanced sonar receive arrays within a sonar dome by reducing an effective speed of sound within the dome.

Still another object of this invention is to provide enhanced sonar receive arrays within a sonar dome by introducing a small amount of bubbles that will effectively reduce sound speed within the dome.

In accordance with one aspect of this invention, there is provided a sonar dome having at least a receive array housed therein. A plurality of independently generated bubbles are formed within the fluid of the sonar dome, the generated bubbles being of an amount and size to reduce the speed of sound within the dome relative to an absence of the generated bubbles and thereby increase an effective aperture of the receive array. Typically, each individual bubble is less than 0.01 mm in diameter. The generated bubbles should be sized to remain stable over a long period of time, enable a constant speed of sound within the fluid, and have a large resonance frequency in comparison to the bandwidth of interest.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
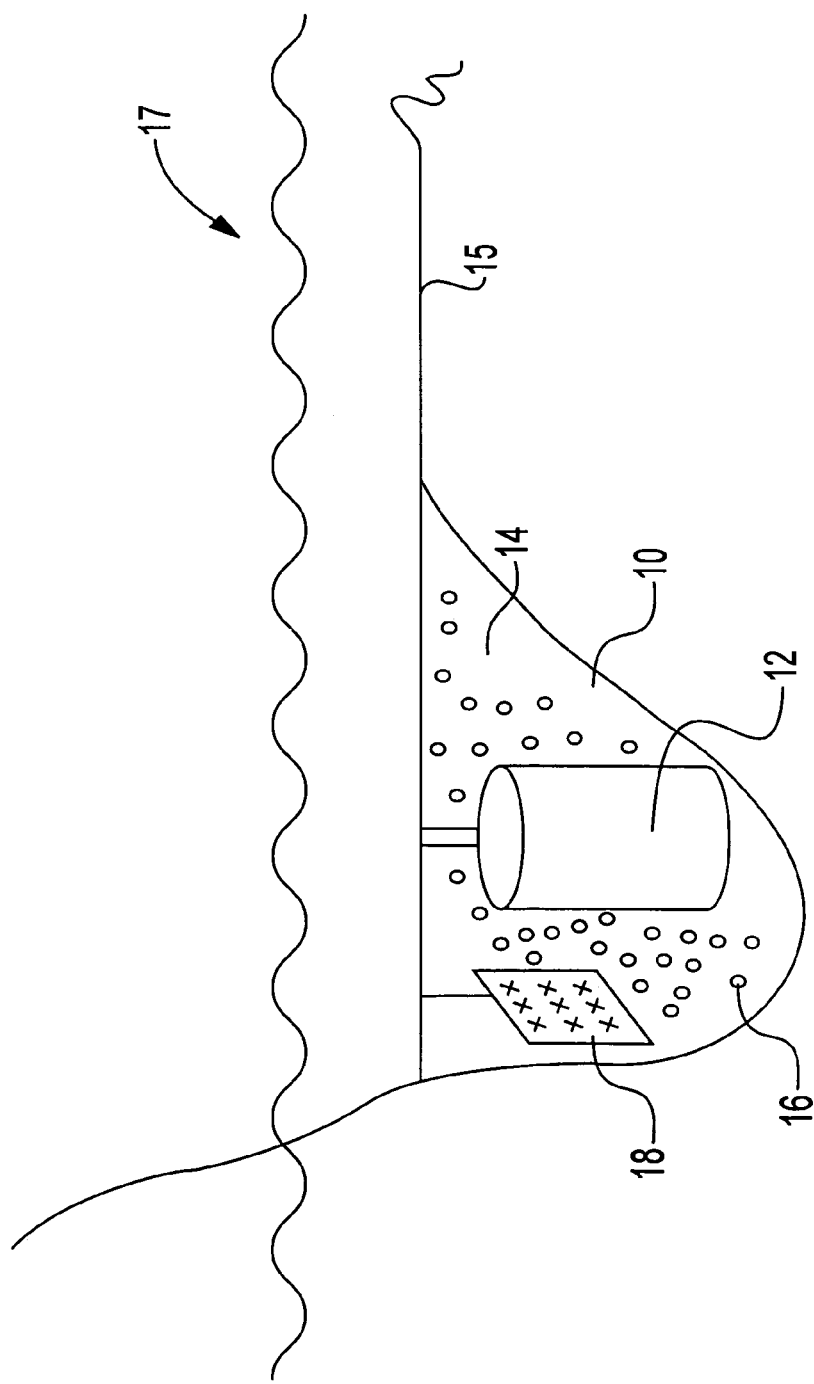
FIG. 1 is a schematic view of a modified sonar dome according to a preferred embodiment of the present invention.

The present invention is explained in connection with the sonar dome shown generally at element 10 in the FIG. 1. Other components of the sonar dome 10 relative to explanation of the invention include a receive array 12 and a fluid medium 14 housed within the sonar dome 10. The fluid medium 14 is typically environmental seawater since the sonar dome 10 under consideration is used in the active or passive underwater detection of ocean targets (not shown). Other fluid media can be used within the scope of this invention. It will be understood that the sonar dome 10 is in fact of the type that is mounted to a ship's or submarine's hull 15 under a surface 17 of water and will contain all the necessary elements to function to that end, although these additional components will not be described herein as they are not pertinent to the subject matter of the invention.

Figure 2A:
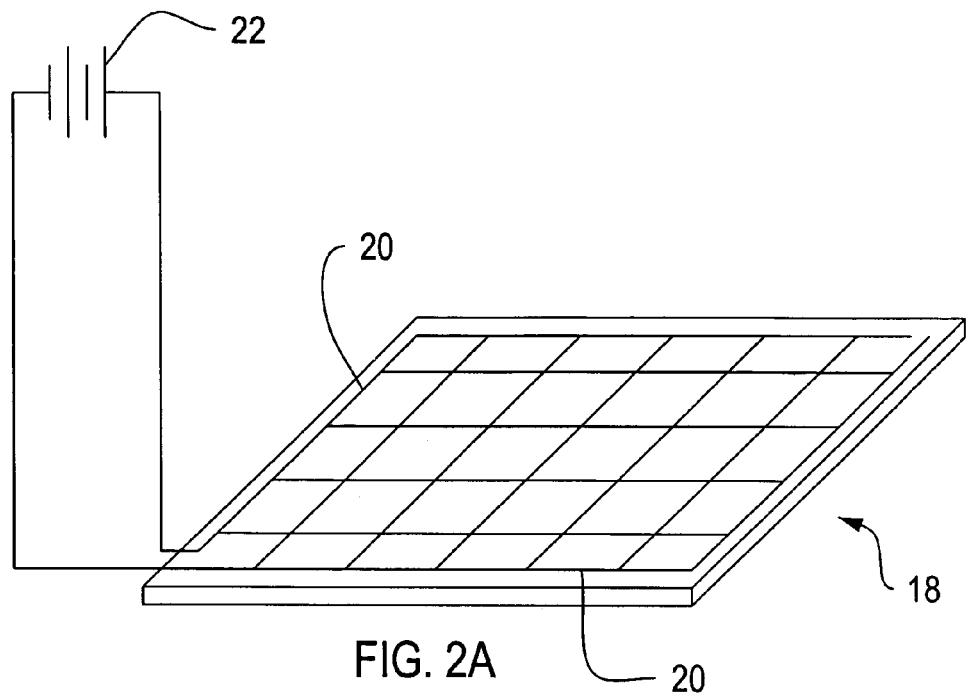
FIG. 2A is a schematic view of a first bubble generating means.
Figure 2B:
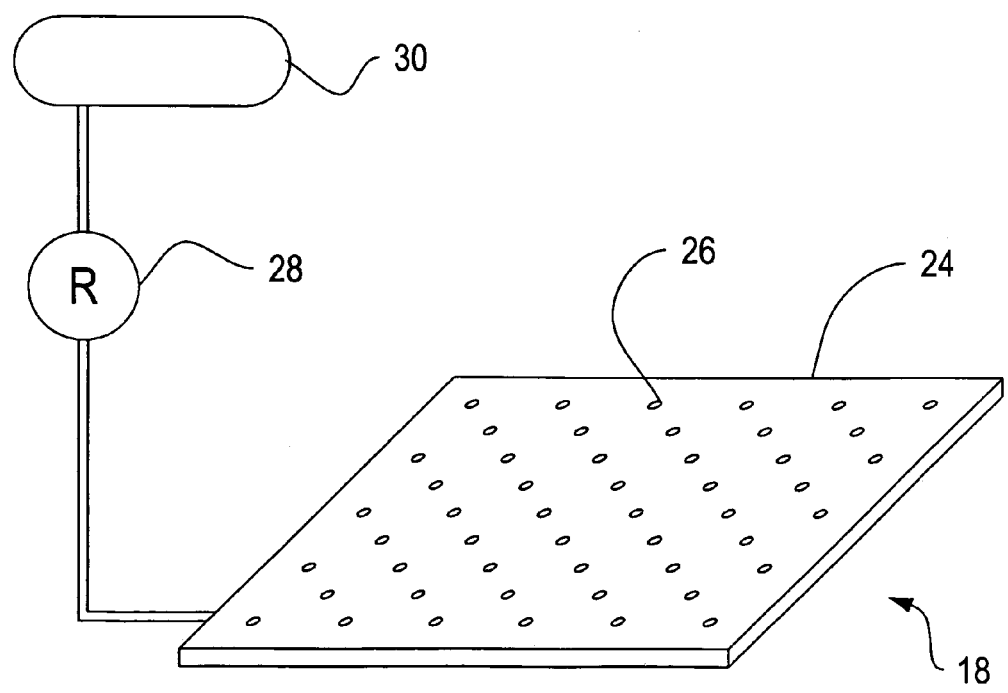
FIG. 2B is a schematic view of a second bubble generating means.

The premise of the present invention is that the introduction of a very small quantity of bubbles 16 can significantly reduce the sound speed within the sonar dome 10. The introduction of the bubbles 16 may be by any known method. By way of example only, it is suggested that the introduction of the bubbles 16 can be by a bubble grid 18 located in the sonar dome 10. FIG. 2A shows a bubble grid 18 formed of electrodes 20 joined to a power source 22 to enable the formation of electrolytically-generated bubbles. Use of electrolytic bubble generation has the advantage of precise control over bubble size. FIG. 2B shows an alternative bubble grid 18 wherein the bubble grid 18 is a plate 24 having apertures 26 therein for formation of bubbles 16. Bubble grid 18 is joined to a regulator 28 and a gas source 30. Gas source 30 can introduce air or another gas into the fluid medium 14 within the sonar dome 10. In either of these embodiments, the power source or the gas source can be controlled to create bubbles on demand.

Regardless of the device used for introduction of bubbles 16 into the fluid medium 14, it is the inventor's discovery that the bubbles 16 must have a very small diameter, on the order of 0.01 mm or less. The main reason for this is that small bubbles have a very low terminal velocity, so that they will remain relatively stable in a uniform dispersion over long periods of time. Bubble coalescence is also undesirable. This will lead to uniform sound speed properties in the sonar dome 10, avoiding degradation in performance. Also, bubbles of this size will resonate at very high frequencies (which will be out of band width for most sonar systems). To this end alternate fluids and gasses may give better stability within the sonar dome. For example, more viscous fluids such as glycerin may retain the bubbles better, and denser gasses such as xenon may be less subject to buoyant movement and coalescence; however, in the presently preferred embodiment seawater and the electrolytic hydrogen-oxygen mix of gasses is preferred.

A key feature of the present invention is control over bubble size. If sufficient control over bubble size cannot be achieved, it is better not to introduce bubbles at all, because they will coalesce and degrade sonar performance.

For example, a volume fraction of 0.03% air reduces the sound speed of the mixture by a factor of two. This would double the effective aperture of the sonar receive array(s) 12, leading to a factor of two reduction in beam width. Practical considerations met by the present invention include: generating a bubble field that will remain stable over long periods of time; generating a uniform bubble field so that the sound speed does not vary; and generating bubbles that are very small so that their terminal velocity is low and their resonance frequency is large compared to the bandwidth of interest (so that their properties over the band are relatively frequency independent).

Accordingly, an effective aperture of sonar receive arrays 12 enclosed in a sonar dome 10 can be increased. This is done by reducing the effective speed of sound inside the dome 10, so that the same sized array 12 is larger compared to a wavelength than it otherwise would be if the dome 10 were simply filled with pressurized water. This will lead to increased resolution (narrower beams) at the expense of a small reduction in receive sound pressure levels (due to increased reflections resulting from impedance differences). The optimum tradeoff between beam width and sound pressure level will be determined individually for each system.

The principal advantage of the present invention is that narrower beams can be realized with only a small loss in the sound pressure level. In the example involving an air volume fraction of 0.03%, the beam width would be reduced by a factor of two, while the level would only decrease by 11% (based on a one-dimensional analysis of sound transmitted from water to the bubbly medium).

In view of the above detailed description, it is anticipated that the invention herein will have far reaching applications other than those of underwater sonar receive arrays.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A sonar system comprising:
   a sonar dome;
   an acoustic array housed within said sonar dome;
   a fluid within said sonar dome; and
   a bubble generating means positioned within said sonar dome to generate a plurality of bubbles within said fluid in a quantity and size to reduce speed of sound within said sonar dome from that with said fluid alone, wherein each of said plurality of bubbles has a diameter not more than 0.01 mm.

2. The apparatus according to claim 1 wherein said plurality of bubbles have a low terminal velocity in said fluid.

3. The apparatus according to claim 1 wherein said plurality of bubbles are a 0.03% volume fraction of gas to said fluid within said sonar dome.

4. The apparatus according to claim 1 wherein said plurality of generated bubbles reduce a speed of sound within said sonar dome by a factor of two.

5. The apparatus according to claim 1 wherein said bubble generating means comprises:
   a power source; and
   a grid of electrodes joined to said power source and positioned in said sonar dome for electrolytically generating the plurality of bubbles.

6. The apparatus according to claim 1 wherein said bubble generating means comprises:
   a gas source; and
   a bubble grid joined to said gas source, said bubble grid being positioned inside said sonar dome.

* * * * *